US012750740B2

(12) United States Patent
Gusman et al.

(10) Patent No.: US 12,750,740 B2
(45) Date of Patent: Sep. 29, 2026

(54) COMMUNICATION RESILIENCY SYSTEM FOR TRIBAL GROUND STATIONS

(71) Applicants: James John Gusman, Saint Cloud, FL (US); Oscar Ramirez, Rancho Mission Viejo, CA (US)

(72) Inventors: James John Gusman, Saint Cloud, FL (US); Oscar Ramirez, Rancho Mission Viejo, CA (US)

( * ) Notice: Subject to any disclaimer, the term of this patent is extended or adjusted under 35 U.S.C. 154(b) by 332 days.

(21) Appl. No.: 18/524,276

(22) Filed: Nov. 30, 2023

(65) Prior Publication Data

US 2025/0344107 A1 Nov. 6, 2025

(51) Int. Cl.
*H04W 4/00* (2018.01)
*H04B 7/185* (2006.01)
*H04W 28/26* (2009.01)

(52) U.S. Cl.
CPC ........ *H04W 28/26* (2013.01); *H04B 7/18582* (2013.01); *H04B 7/18584* (2013.01); *H04B 7/18593* (2013.01)

(58) Field of Classification Search
CPC ............... H04W 28/26; H04B 7/18582; H04B 87/18584
USPC ........................................................ 370/329
See application file for complete search history.

(56) References Cited

U.S. PATENT DOCUMENTS

| | | | | |
|---|---|---|---|---|
| 6,058,307 | A * | 5/2000 | Garner | H04B 7/18567 455/12.1 |
| 6,244,967 | B1 * | 6/2001 | Takabe | F16J 3/041 24/20 R |
| 10,707,952 | B2 * | 7/2020 | Dankberg | H01Q 1/288 |
| 2004/0260766 | A1 * | 12/2004 | Barros | H04L 67/52 709/218 |
| 2018/0227043 | A1 * | 8/2018 | Dankberg | H04B 7/18513 |
| 2018/0254825 | A1 * | 9/2018 | Speidel | H04B 7/18582 |
| 2021/0336692 | A1 * | 10/2021 | Choi | H04B 7/18567 |
| 2022/0022267 | A1 * | 1/2022 | Shi | H04W 56/001 |
| 2023/0412259 | A1 * | 12/2023 | Yun | H02J 7/0048 |
| 2024/0223266 | A1 * | 7/2024 | Sadri | H04L 27/2601 |

* cited by examiner

*Primary Examiner* — Marceau Milord
(74) *Attorney, Agent, or Firm* — Maier & Maier, PLLC

(57) ABSTRACT

In exemplary embodiments communication resiliency methods and systems for tribal ground stations may be described. An exemplary communication system may include a first ground station and a second ground station. The first ground station and the second ground station may be located on one or more tribal reservations. The first ground station and second ground station may be connected to a satellite. The satellite may be, for example but not limited to, geostationary (GEO) satellites, mid earth orbit (MEO) satellites, low earth orbit (LEO) satellites, polar orbiting satellites, and/or communication satellite constellations. In some embodiments the satellite may be a LEO satellite that provides direct communication between the first ground station and the second ground station.

15 Claims, 2 Drawing Sheets

100

100

200

COMMUNICATION RESILIENCY SYSTEM FOR TRIBAL GROUND STATIONS

BACKGROUND

Public safety and other organizations often use wireless networks and portable electronic devices to facilitate communication among their members. These devices may include portable two-way radios or other devices which operate over land mobile radio, long-term evolution, or other wireless communication networks. However, existing systems are often susceptible to outages in emergency circumstances, or may not have sufficient coverage. Some systems may use satellite communication, however these systems offer less features, and may lack the security of other communication networks.

Additionally, every SAT provider is located in areas that are off reservations. These Ground Station locations are setup and connected to Tier 1 providers, but they are unable to take advantage of any tax or economic benefits such as assisting a Tribal Community. There are also additional technical complications with integrating current tribal communities with both other communities and general Tier 1 providers.

Additionally existing systems are not capable of merging multiple streams for storage. That is to say, existing systems cannot merge voice, video, and other additional data into a single source for storage. What is stored is further not sufficiently secured and/or backed up.

SUMMARY

In exemplary embodiments communication resiliency methods and systems for tribal ground stations may be described. An exemplary communication system may include a first ground station and a second ground station. The first ground station and the second ground station may be located on one or more tribal reservations. The first ground station and second ground station may be connected to a satellite. The satellite may be, for example but not limited to, geostationary (GEO) satellites, mid earth orbit (MEO) satellites, low earth orbit (LEO) satellites, polar orbiting satellites, and/or communication satellite constellations. In some embodiments the satellite may be a LEO satellite that provides direct communication between the first ground station and the second ground station.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
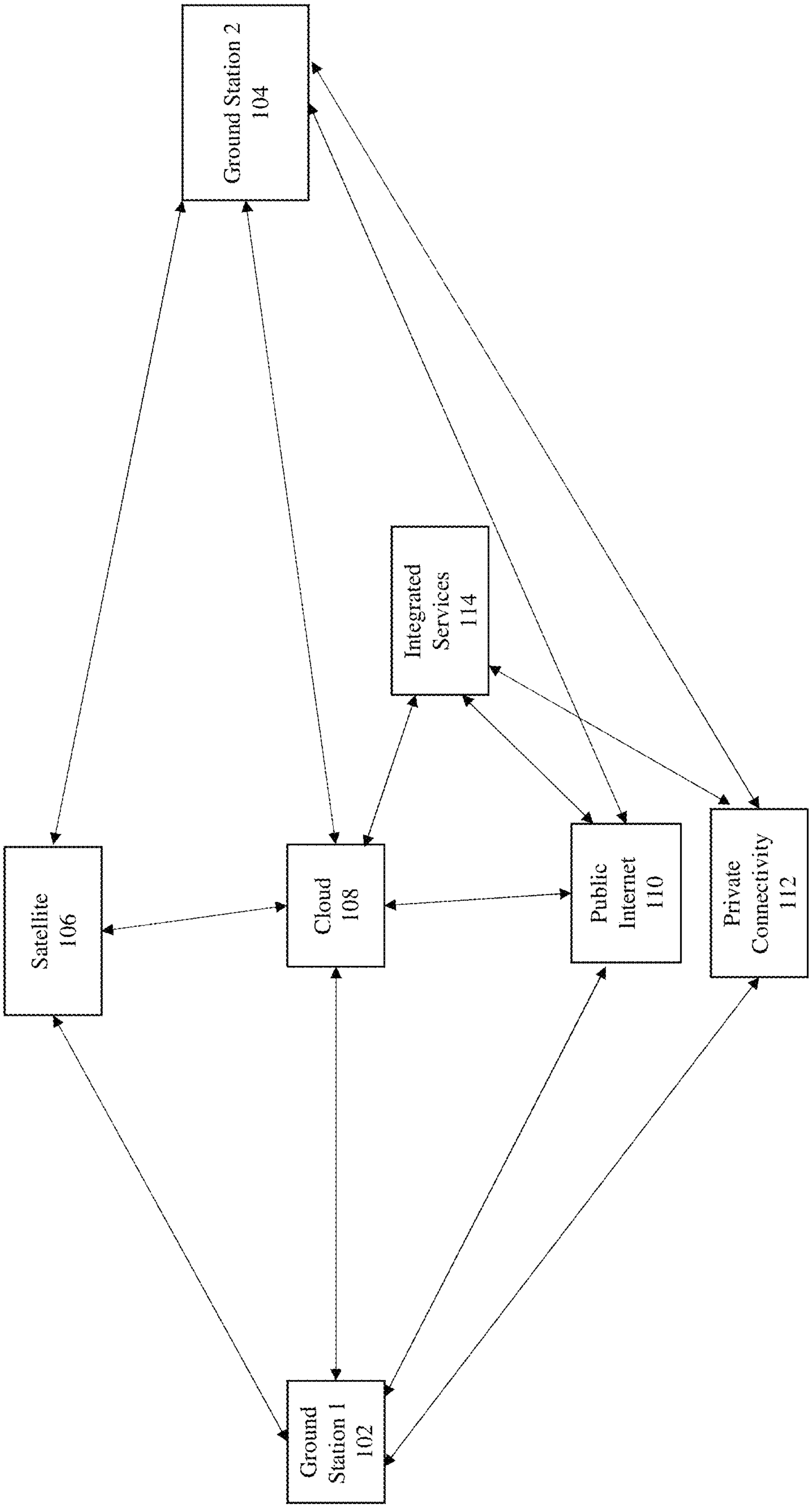
FIG. 1 is an exemplary communication resiliency system for tribal ground stations.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

In one or more exemplary embodiments a communication resiliency system for tribal ground stations 100 may be provided. The exemplary communication system may include a first ground station 102 and a second ground station 104. The first ground station 102 and the second ground station 104 may be located on one or more tribal reservations. It may also be understood that while two ground stations are shown and described in this embodiment, in other embodiments any number of ground stations may be contemplated. The first ground station 102 and second ground station 104 may be connected to a satellite 106. The satellite 106 may be, for example but not limited to, geostationary (GEO) satellites, mid earth orbit (MEO) satellites, low earth orbit (LEO) satellites, polar orbiting satellites, and/or communication satellite constellations. In some embodiments the satellite 106 may be a LEO satellite that provides direct communication between the first ground station 102 and the second ground station 104.

The communication network 100 may further include a cloud network 108. The cloud network 108 may be, for example, a public, private, and/or hybrid cloud network. The cloud network 108 may be connected to the first ground station 102 and the second ground station 104, or subsequent/multiple ground stations via, for example, a secured Internet or private wide area network (WAN) 112 and may provide IP transit, control and/or management traffic, routing intelligence based on multiple metrics for faster data path reachability, as well as redundancy and resiliency. In some embodiments the connection between the ground stations and cloud network 108 may be facilitated by, for example, low-latency routers, high-throughput switches, and network appliances such as firewalls, load balancers, and WAN accelerators. In some embodiments the network appliances may be programmed and/or automated, for example with AI or ML, to steer traffic to the fastest and least congested path based on a plurality of metrics, for example latency, hitter, packet loss, utilization, etc. The cloud network 108 may include, for example, encryption and authentication services and/or management and orchestration servers. In some embodiments the cloud network 108 may provide additional services, for example backup and synchronization services between datacenters and/or ground stations. The services may be performed on a scheduled basis, for example once a week or once a month, or may be performed on an on demand basis. The on demand basis may be a request from an operator or user, and/or may be triggered by automatic detection of abnormalities or potential issues in the system. In some embodiments embodiments one or more technologies may be used, including but not limited to Network Attached Storage (NAS), Storage Area Network (SAN), and/or Hyper-converged Infrastructure (HCI). The first ground station 102 and second ground station 104 may further be connected to a public internet service 110. Communication between the first ground station 102 and the second ground station 104 may be through any of the LEO satellite 106, the cloud network 108, and/or the public internet 110. In an embodiment the default communication method may be, for example IP protocol. In some embodiments encapsulation methods, including but not limited to, IPsec or session encryption may be utilized.

In some embodiments a private connection 112 may further be used for communication. Some or all of the forms of communication may further be routed through various integrated services 114. The integrated services 114 may include, for example but not limited to, encryption, security network services by means of network access control (NAC), authentication, authorization, and accounting tools (AAA) like TACACS+ and/or Radius, monitoring and telemetry via mechanisms like SNMP, NetFlow/SFlow/Jflow/IPFIX, as well as polling via protocols ICMP, NETCONF, APIs, and/or automated scripts. Integrated services may also leverage advanced routing protocols and standards intended to provide sub-second failover.

Figure 2:
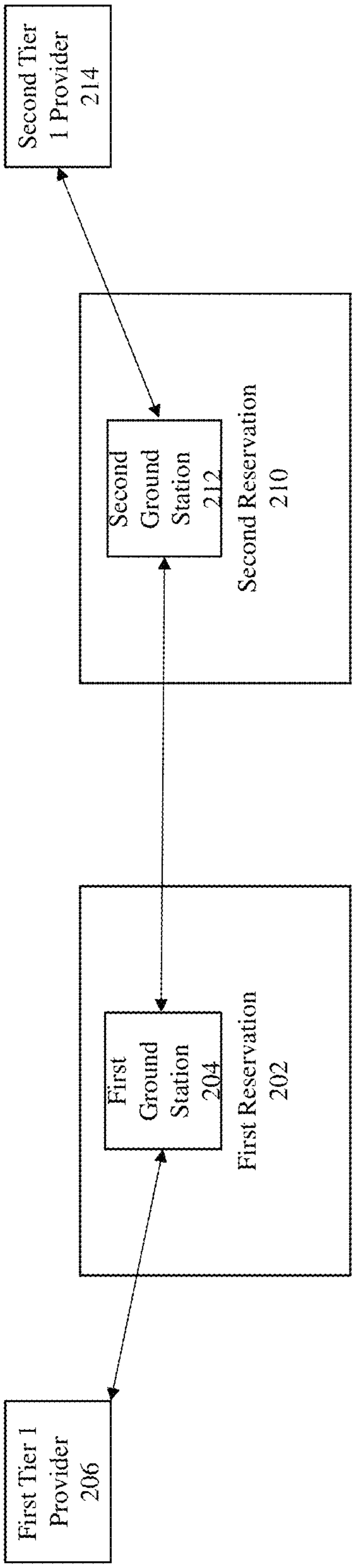
FIG. 2 is an exemplary communication redundancy system between reservations.

Referring to FIG. 2, a communication redundancy system between reservations 200 may be shown and described. There may be a first reservation 202 and a second reservation 210. It may be understood that in other embodiments there may be any number of additional interconnected reservations. The first reservation 202 may have at least a first ground station 204. The second reservation may have at least a second ground station 212. The first ground station may be connected to a first tier 1 provider, who may provide, for example, internet access. The connection may be, for example, a point-2-point connection. The second ground station 212 may be connected to a second tier 1 provider 214. In an embodiment the first ground station 204 and second ground station 212 may be connected and act as a redundancy system. For example, in an embodiment if the first tier 1 provider is having an outage, the first ground station may route through the second ground station, which may give the first reservation continued access to the Internet or other services, even when the usual provider is down. In some embodiments a routing algorithm may be utilized, which may utilize automation and/or AI/ML to determine optimal routing paths. The routing algorithm may be triggered to be utilized when one or more thresholds are exceeded, which may indicate, for example, an outage, over-utilization of a tier 1 provider, high latency, jitter, packet loss, or other detected issues. In some embodiments the routing algorithm may use a combination of features and protocols like, for example, IP SLAs, and/or route and interface tracking in order to collect data about metrics like latency, jitter, packet loss, and perform health checks. By reading such variables, the system may utilize one or more technologies, including for example, Fast Reroute (FRR) and Bidirectional Forwarding Detection (BFD) for sub-second failover, and/or may perform traffic engineering if the situation calls for data path adjustment.

In some embodiments the redundancy may also be utilized in other circumstances, for example the first reservation may be using more than the maximum capacity of the first tier 1 provider 206, which may lead to slower speeds or intermittent connectivity problems. Where there are speed or intermittent connectivity problems a partial portion of traffic may be redirected to the second tier 1 provider 214 through the second ground station 212. In another embodiment the redundant connection may be used when bandwith usage increases beyond a predetermined amount. It may be understood this may increase both provider speeds as well as network resiliency.

In some embodiments the ground stations may determine a best path between the plurality of communication connections, for example the the ground stations be connected to a public internet connection, a private connectivity, a cloud, and/or a satellite, and may determine that the satellite is the best connection for a particular communication and may therefore send that communication through the satellite. In some embodiments the best path may be decided based on a plurality of factors, for example speed, latency, and/or packet loss. An internal software using, for example, a service level agreement may constantly or periodically run tests over one or more associated links in order to determine connection information. In some embodiments a user may be able to manually select a preferred communication method, which may then either be given priority and/or be used exclusively, with remaining connections being used as, for example, backup connections in case of outages. In an embodiment there may be a plurality of other connected ground stations which may be included in the best path determination. In some embodiments AI or ML may be utilized in the best path determination, for example AI or ML may constantly monitor the plurality of factors such as speed, latency, and/or packet loss, and may make determinations as to when and where to switch connections in order to maintain the best path.

In some embodiments the ground stations may be connected to specific satellite providers who may be contracted with the ground station and/or may be a part of managed services. The managed services may include, for example. performing hardware functions such as rebooting equipment, installing new equipment, checking on systems making noise, performing software maintenance, and/or physical component installations. The ground stations may connect the satellite to ground services such as internet and other dedicated link backhauls, such as point to point fiber or microwave. In some embodiments the ground station maybe a physical structure that houses tenant systems and connectivity equipment, while in other embodiments they the ground station may have their own servers, virtual and/or physical, that can utilize the ground stations hardware for compute or just from a network aspect to connect to internal and outside connectivity such as Internet links, MPLS, or point to point circuits.

In some embodiments one or more communication network shelters may be provided. The sheleters may provide additional points of connectivity and/or resiliency between the ground station. The shelters may be completely self-contained environments that have their own heating and cooling systems, on or off-grid power connectivity, solar panels, generators with fuel types determined by the location and power requirements, battery backups, and/or wind turbine and generator. The shelters may additionally contain storage or backup capabilities for the ground station connections. In some embodiments one or more of the above may be provided for the shelters. Different shelters in the system may contain different systems and/or may be different sizes based on environment and requirements.alit may be understood that the shelter may be rugged and may be able handle the extremes of the environments they are deployed in. For example, the shelter may be configured to handle extreme heat or cold, extreme dry environments, and/or extremely wet environments.

In some embodiments the redundancy system of FIG. 2 may be integrated with the communication system of FIG. 1. The redundancy system may utilize a combination of other forms of communication, for example the satellite 106 or cloud 108, in addition to routing to the second tier 1 provider 214 through the second ground station 212. In some embodiments determining a best path may take into consideration redundant communication processes, for example redundant tier 1 providers.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A communication system comprising:

at least a first ground station and a second ground station that are communicatively coupled;

one or more satellites, communicatively coupled to the at least first ground station and second ground station;

a public internet connection or private connection to another remote end, communicatively coupled directly to the at least first ground station and second ground station; and a cloud network communicatively coupled directly to the at least first ground station and second ground station;

wherein the at least first ground station and at least second ground station determine a best communication path from among the one or more satellites, the public internet connection, and the cloud network utilizing a routing algorithm.

2. The communication system of claim 1, wherein the first ground station is located on a first tribal reservation and the second ground station is located on a second tribal reservation.

3. The communication system of claim 2, wherein the first ground station and second ground station further perform one or more of encryption and authentication, monitoring, backups, and advanced routing for failover.

4. The communication system of claim 2, wherein if at least a first threshold is triggered, the first ground station reroutes at least some traffic through the second ground station.

5. The communication system of claim 4, wherein the first threshold is one or more of a threshold decrease in speed or a threshold amount of interrupted traffic.

6. The communication system of claim 5, wherein the public internet connection communicatively coupled to the first ground station is a first tier 1 provider and the public internet connection communicatively coupled to the second ground station is a second tier 1 provider.

7. The communication system of claim 4, wherein the first threshold is more than a predetermined amount of bandwidth usage.

8. The communication system of claim 1, further comprising one or more shelter facilities configured to provide redundancy between at least the first ground station and the second ground station.

9. The communication system of claim 8, wherein the shelter facility further comprises at least a heating and cooling system, off-grid power connectivity, solar panels and a generator.

10. The communication system of claim 9, wherein the shelter facility is further configured for extreme heat and dry conditions.

11. The communication system of claim 9, wherein the shelter facility is further configured for extreme heat and wet conditions.

12. The communication system of claim 1, wherein the connection between the cloud network provides at least backup and synchronization services between the first ground station and the second ground station.

13. The communication system of claim 1, wherein the cloud network further utilizes one or more of Network Attached Storage (NAS), Storage Area Network (SAN), and/or Hyper-converged Infrastructure (HCI).

14. The communication system of claim 1, wherein the one or more satellites are low earth orbit satellites.

15. The communication system of claim 1, wherein the routing algorithm monitors and utilizes a plurality of speed, latency, jitter, and packet loss to determine the best path.

* * * * *